United States Patent
Chang et al.

(10) Patent No.: US 8,508,500 B2
(45) Date of Patent: Aug. 13, 2013

(54) TOUCH PANEL ELECTRICAL DEVICE AND METHOD FOR OPERATING THEREOF

(75) Inventors: Yao-Tsung Chang, Taipei Hsien (TW);
Pin-Hsien Su, Taipei Hsien (TW);
Yang-Peng Chen, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 628 days.

(21) Appl. No.: 12/819,236

(22) Filed: Jun. 21, 2010

(65) Prior Publication Data
US 2011/0080369 A1 Apr. 7, 2011

(30) Foreign Application Priority Data
Oct. 5, 2009 (TW) .............................. 98133760 A

(51) Int. Cl.
*G06F 3/045* (2006.01)
(52) U.S. Cl.
USPC ........................... 345/174; 345/173; 345/158
(58) Field of Classification Search
USPC .................... 345/173, 174, 700, 158
See application file for complete search history.

(56) References Cited

U.S. PATENT DOCUMENTS

| | | | |
|---|---|---|---|
| 8,164,573 B2 | 4/2012 | DaCosta et al. | |
| 8,330,737 B2 * | 12/2012 | Aono et al. | 345/173 |
| 2003/0025721 A1 * | 2/2003 | Clapper et al. | 345/700 |
| 2005/0035951 A1 | 2/2005 | Bjorkengren | |
| 2007/0109239 A1 * | 5/2007 | den Boer et al. | 345/87 |
| 2007/0236474 A1 | 10/2007 | Ramstein | |
| 2009/0160813 A1 * | 6/2009 | Takashima et al. | 345/173 |
| 2010/0013794 A1 * | 1/2010 | Abileah et al. | 345/174 |
| 2010/0020044 A1 * | 1/2010 | Abileah et al. | 345/175 |
| 2010/0312625 A1 * | 12/2010 | Miller et al. | 705/14.5 |

FOREIGN PATENT DOCUMENTS

| | | |
|---|---|---|
| CN | 1582425 A | 2/2005 |
| CN | 1906658 A | 1/2007 |
| CN | 101464750 A | 6/2009 |
| CN | 101467118 A | 6/2009 |

OTHER PUBLICATIONS

CN 2nd Office Action & its partial English translation.

* cited by examiner

*Primary Examiner* — Thuy Pardo
(74) *Attorney, Agent, or Firm* — CKC & Partners Co., Ltd.

(57) ABSTRACT

A touch panel electrical device includes a touch panel, a notice signal generator and a processing unit. The processing unit is electrically connected with the touch panel and the notice signal generator respectively. The touch panel senses a touched position on the touch panel. The processing unit includes a notice-generating module. The notice-generating module makes the notice signal generator generate a notice sound signal or a notice vibration signal according to the touched position to notice a user a touched instruction corresponding to the touched position he/she touches.

19 Claims, 4 Drawing Sheets

TOUCH PANEL ELECTRICAL DEVICE AND METHOD FOR OPERATING THEREOF

RELATED APPLICATIONS

This application claims priority to Taiwan Application Serial Number 98133760, filed Oct. 5, 2009, which is herein incorporated by reference.

BACKGROUND

1. Technical Field

The present invention relates to an electrical device and method for operating thereof. More particularly, the present invention relates to a touch panel electrical device and method for operating thereof.

2. Description of Related Art

A touch panel is a display that can detect the presence and location of a touch, which is made through a finger or a pen nib, within the display area. Nowadays, resistive touch panels and capacitive touch panels are very popular. Resistive touch panels are operated through sensing voltage change, which is made through pressing resistive touch panels. Capacitive touch panels are operated through sensing current from fingers. Wherein, capacitive touch panels provide better sensitivity than resistive touch panels do. Lately, Complementary Metal-Oxide-Semiconductor (CMOS) is utilized to implement touch panels, which provide better sensitivity.

In general, a touch panel electrical device may sense a touched position or trace on its touch panel and execute an instruction corresponding to the touched position or trace. Users may make touch panel electrical devices execute instructions through touching graphical icons shown on touch panels. Since gorgeous video can be shown on touch panels, which is attractive to consumers, touch panels are often utilized to replace mechanical button lately.

However, it's difficult for blind people to use touch panel electrical device since blind people can't see graphical icon on touch panel electrical device.

SUMMARY

According to one embodiment of this invention, a touch panel electrical device includes a touch panel, a notice signal generator and a processing unit. The processing unit is electrically connected with the touch panel and the notice signal generator respectively. The touch panel senses a touched position on the touch panel. The processing unit includes a notice-generating module. The notice-generating module makes the notice signal generator generate a notice sound signal or a notice vibration signal according to the touched position to notice a user of a touched instruction corresponding to the touched position he/she touches.

According to another embodiment of this invention, a method for operating a touch panel electrical device is provided. The touch panel electrical device includes a touch panel. The method for operating the touch panel electrical device includes the following steps: a touched position on the touch panel is sensed. A notice sound signal or a notice vibration signal is generated according to the touched position to notice a user of a touched instruction corresponding to the touched position he/she touches. Determine if execute the touched instruction or not. If the touched instruction is determined to be executed, make the touch panel electrical device execute the touched instruction.

According to another embodiment of this invention, a method for operating a touch panel electrical device according to touched area is provided. The touch panel electrical device includes a touch panel. The method for operating the touch panel electrical device according to touched area includes the following steps: a touched position on the touch panel is sensed. Determine if execute a touched instruction corresponding to the touched position or not according to a present touched area around the touched position on the touch panel. If the touched instruction is determined to be executed, make the touch panel electrical device execute the touched instruction.

According to another embodiment of this invention, a method for operating a touch panel electrical device according to touched pressure is provided. The touch panel electrical device includes a touch panel. The method for operating the touch panel electrical device according to touched pressure includes the following steps: a touched position on the touch panel is sensed. Determine if execute a touched instruction corresponding to the touched position or not according to a present touched pressure on the touched position. If the touched instruction is determined to be executed, make the touch panel electrical device execute the touched instruction.

Above all, users may realize the touched instruction corresponding to the touched position according to the notice vibration signal they feel or the notice sound signal they hear. Hence, blind people can operate touch panel electrical devices without seeing graphical button shown by touch panels. In addition, several embodiments are provided to make touch panel electrical devices execute instructions selected through touch panels.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
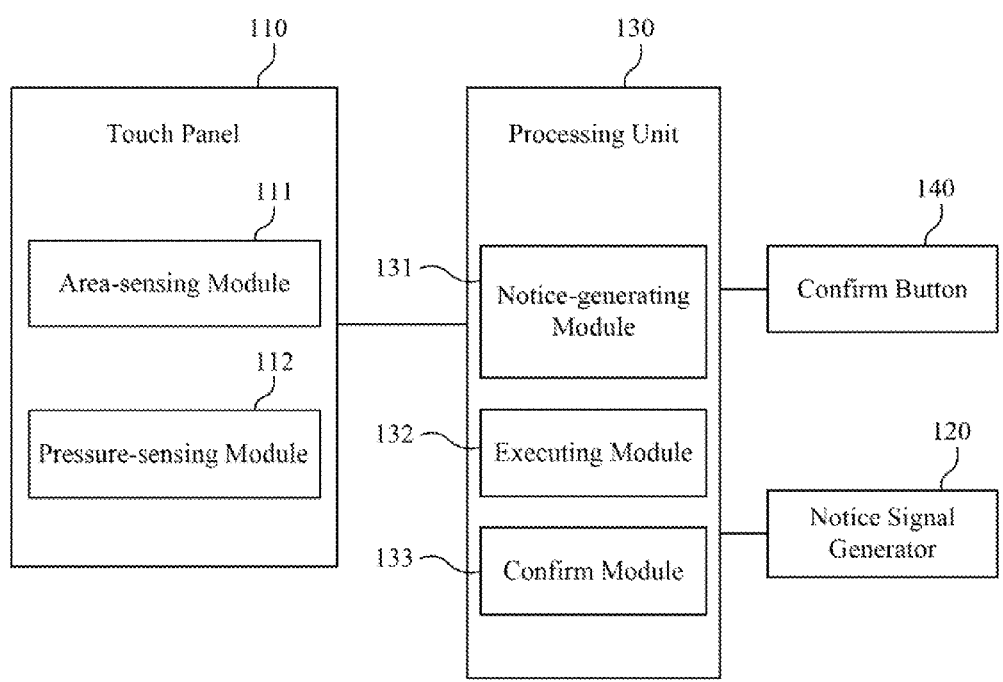
FIG. 1 is a block diagram of a touch panel electrical device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a touch panel electrical device according to one embodiment of this invention. The touch panel electrical device generates a notice signal according to a touched position on its touch panel to notice users the touched instruction corresponding to the touched position they touch. Besides, the touched instruction is executed if the touched position has been continually touched and a confirm signal is received.

The touch panel electrical device 100 includes a touch panel 110, a notice signal generator 120 and a processing unit 130. The processing unit 130 is electrically connected with the touch panel 110 and the notice signal generator 120 respectively. The touch panel 110 senses a touched position on the touch panel 110. The processing unit 130 includes a notice-generating module 131. The notice-generating module 131 makes the notice signal generator 120 generate a notice sound signal or a notice vibration signal according to the touched position. Therefore, users may realize the touched instruction corresponding to the touched position they touch according to the notice sound signal or the notice vibration signal.

In one embodiment, the notice signal generator 120 may be a speaker to generate the notice sound signal. For example, if the touched instruction corresponding to the touched position is a number instruction "1", the notice-generating module 131 makes the notice signal generator 120 generate a notice sound signal which may represent "1", such as a voice speaking "one" or a combination of short and long beeps to represent "1". Therefore, users may realize that the touched position corresponds to a number instruction "1" according to the notice sound signal they hear. In other embodiments, different types of sound signals may be utilized to notice users of the touched instruction corresponding to the touched position they touched, which should not be limited in this disclosure.

In another embodiment, the notice signal generator 120 may be a vibrator to generate the notice vibration signal. For example, if the touched instruction corresponding to the touched position is a number instruction "1", the notice-generating module 131 makes the notice signal generator 120 generate a notice vibration signal which may represent "1", such as vibrating for one time. Therefore, users may realize that the touched position corresponds to a number instruction "1" according to the vibrating number they feel. In other embodiments, different types of vibration signals may be utilized to notice users of the touched instruction corresponding to the touched position they touched, which should not be limited in this disclosure.

If the touched position has been continually touched and a confirm signal is received, the touch panel electrical device 100 may execute the touched instruction. Hence, the processing unit 130 may include an executing module 132 to execute the touched instruction if the touched position has been continually touched and a confirm signal is received. In addition, the processing unit 130 may include a confirm module 133. In one embodiment, the confirm module 133 may generate the confirm signal when the touched position is pressed. Therefore, when a user has continually touched the touched position and presses the touched position, the executing module 132 executes the touched instruction corresponding to the touched position he/she touches.

In one embodiment, since the touched area or the touched area variation on the touch panel 110 when users press the touch panel 110 is more than that when users touch the touch panel 110, the touch panel electrical device 100 may determine if users press the touch panel 110 or not according to the touched area on the touch panel 110. Therefore, the touch panel 110 may include an area-sensing module 111 to sense a present touched area around the touched position on the touch panel 110. Wherein, a touched pixel number of the touch panel 110 around the touched position may be sensed to calculate the present touched area. The confirm module 133 of the processing unit 130 calculates a touched area variation between the present touched area and a previous touched area. Wherein, the touched area variation may be difference, ratio or other statistics value between the present touched area and the previous touched area. If the touched area variation is more than a pressed area variation threshold, the confirm module 133 determines that the touched position is pressed and generates the confirm signal. In other embodiments, the confirm module 133 may determine if the touched position is pressed by determining if the touched area is more than a pressed area threshold, which should not be limited in this embodiment.

In another embodiment, since the touched pressure or the touched pressure variation on the touch panel 110 when users press the touch panel 110 is larger than that when users touch the touch panel 110, the touch panel electrical device 100 may determine if users press the touch panel 110 or not according to the touched pressure on the touch panel 110. Therefore, the touch panel 110 may include a pressure-sensing module 112 to sense a present touched pressure on the touched position. The confirm module 133 of the processing unit 130 calculates a touched pressure variation between the present touched pressure and a previous touched pressure. Wherein, the touched pressure variation may be difference, ratio or other statistics value between the present touched pressure and the previous touched pressure. If the touched pressure variation is more than a pressed pressure variation threshold, the confirm module 133 determines the touched position is pressed and generates the confirm signal. In other embodiments, the confirm module 133 may determine if the touched position is pressed by determining if the present touched pressure is more than a pressed pressure threshold, which should not be limited in this embodiment.

In addition, there are still other embodiments making the confirm module 133 generate the confirm signal. In one embodiment, the confirm module 133 may generate the confirm signal when the touched position has been continually touched and another position on the touch panel 110 is touched. In another embodiment, the confirm module 133 may generate the confirm signal if the touched position has been touched more than a time threshold. Besides, the touch panel electrical device 100 may include a confirm button 140, electrically connected with the processing unit 130. Wherein, the confirm signal is generated by the confirm button 140 when the confirm button 140 is pressed.

Figure 2:
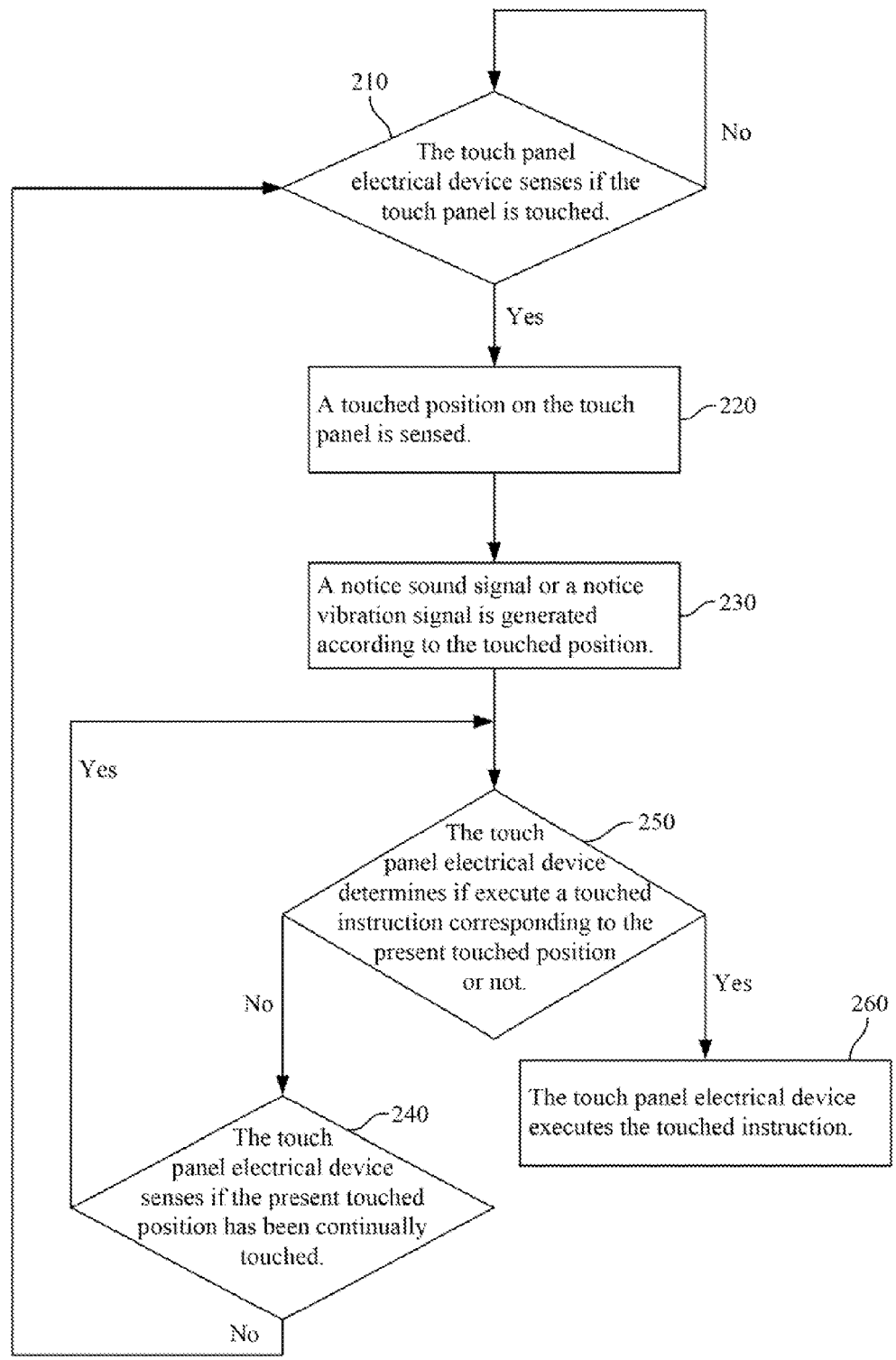
FIG. 2 is a flow diagram of a method for operating a touch panel electrical device according to another embodiment of this invention.

FIG. 2 is a flow diagram of a method for operating a touch panel electrical device according to another embodiment of this invention. The touch panel electrical device includes a touch panel. The method for operating the touch panel electrical device makes the touch panel electrical device generate a notice signal according to a touched position on its touch panel to notice users the touched instruction corresponding to the touched position they touch. Besides, the touched instruction is executed if the touched position has been continually touched and a confirm signal is received. The method for operating the touch panel electrical device 200 includes the following steps:

In step 210, the touch panel electrical device senses if the touch panel is touched. If the touch panel is not touched, the touch panel electrical device keeps sensing if the touch panel is touched (step 210). In step 220, if the touched panel is touched, a touched position on the touch panel is sensed.

In step 230, a notice sound signal or a notice vibration signal is generated according to the touched position. Therefore, users may realize the touched instruction corresponding to the touched position they touch according to the notice sound signal or the notice vibration signal.

In one embodiment, a speaker may be utilized to generate the notice sound signal (step 230). For example, if the touched instruction corresponding to the touched position is a number instruction "1", a notice sound signal which may represent "1", such as a voice speaking "one" or a combination of short and long beeps to represent "1", may be generated. Therefore, users may realize that the touched position corresponds to a number instruction "1" according to the notice sound signal they hear. In other embodiments, different types of sound signals may be utilized to notice users the touched instruction corresponding to the touched position they touched, which should not be limited in this disclosure.

In another embodiment, a vibrator may be utilized to generate the notice vibration signal (step 230). For example, if the touched instruction corresponding to the touched position is a number instruction "1", a notice vibration signal which may represent "1", such as vibrating for one time, may be generated. Therefore, users may realize that the touched position corresponds to a number instruction "1" according to the vibrating number they feel. In other embodiments, different types of vibration may be utilized to notice users the touched instruction corresponding to the touched position they touched, which should not be limited in this disclosure.

In step 250, the touch panel electrical device determines if execute the touched instruction corresponding to the present touched position or not.

In step 260, if the touch panel electrical device determines to execute the touched instruction corresponding to the present touched position, the touch panel electrical device executes the touched instruction.

In step 240, if the touch panel electrical device determines not to execute the touched instruction, the touch panel electrical device senses if the present touched position has been continually touched. If the present touched position has not been continually touched, the touch panel device keeps sensing if the touch panel is touched (step 210). If the present touched position has been continually touched, the touch panel electrical device keeps determining if execute the touched instruction or not (step 250).

There are several embodiments for the touch panel electrical device to determine if execute the touched instruction or not (step 250). In one embodiment, the touch panel electrical device may sense if the touched position has been continually touched and another position on the touch panel is touched for the determination in step 250. Wherein, if the touched position has been continually touched and another position on the touch panel is touched, the touch panel electrical device determines to execute the touched instruction.

In another embodiment, the touch panel electrical device may sense if the touched position has been touched more than a time threshold for the determination in step 250. If the touched position has been touched more than the time threshold, the touch panel electrical device determines to execute the touched instruction.

Besides, the touch panel electrical device may include a confirm button. Wherein, in step 250, the touch panel electrical device determines to execute the touched instruction when the confirm button is pressed.

Figure 3:
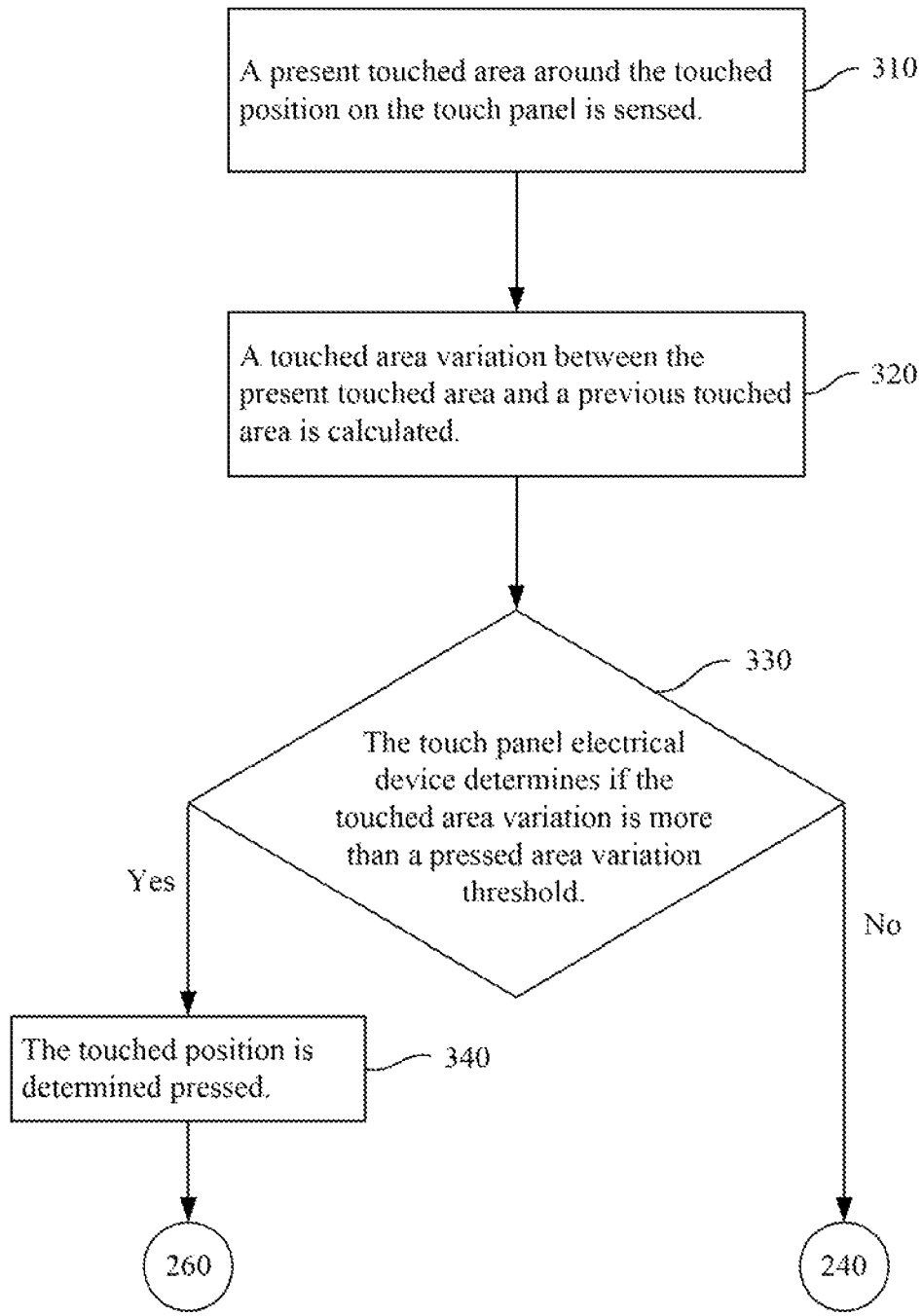
FIG. 3 is one embodiment for the touch panel electrical device to determine if execute the touched instruction or not (step 250) in FIG. 2.

In another embodiment, the touch panel electrical device may sense if the touched position is pressed for the determination in step 250. FIG. 3 is one embodiment for the touch panel electrical device to determine if execute the touched instruction or not (step 250) in FIG. 2. Since the touched area or the touched area variation on the touch panel when users press the touch panel is more than that when users touch the touch panel, the touch panel electrical device may determine if the touched position is pressed according to the touched area on its touch panel. Therefore, the step for the touch panel electrical device to determine if execute the touched instruction or not (step 250) may include the following steps:

In step 310, a present touched area around the touched position on the touch panel is sensed. Wherein, a touched pixel number of the touch panel around the touched position may be sensed to calculate the present touched area.

In step 320, a touched area variation between the present touched area and a previous touched area is calculated. Wherein, the touched area variation may be difference, ratio or other statistics value between the present touched area and the previous touched area. In addition, a touched area sensed previously may be recorded as the previous touched area.

In step 330, the touch panel electrical device determines if the touched area variation is more than a pressed area variation threshold. If the touched area variation is not more than the pressed area variation threshold, the touch panel electrical device senses if the present touched position has been continually touched (step 240). In addition, the present touched area may be recorded as the previous touched area for calculating the next touched area variation if the touched area variation is not more than the pressed area variation threshold.

In step 340, if the touched area variation is more than the pressed area variation threshold, the present touched position is determined pressed. Then, the touch panel electrical device executes the touched instruction corresponding to the present touched position (step 260). In another embodiment, the touch panel electrical device may determine if the present touched position is pressed through determining if the touched area is more than a pressed area threshold, which should not be limited in this embodiment. Wherein, the present touched position is determined pressed if the touched area is more than the pressed area threshold. Therefore, the touch panel electrical device may be operated according to touched area.

Figure 4:
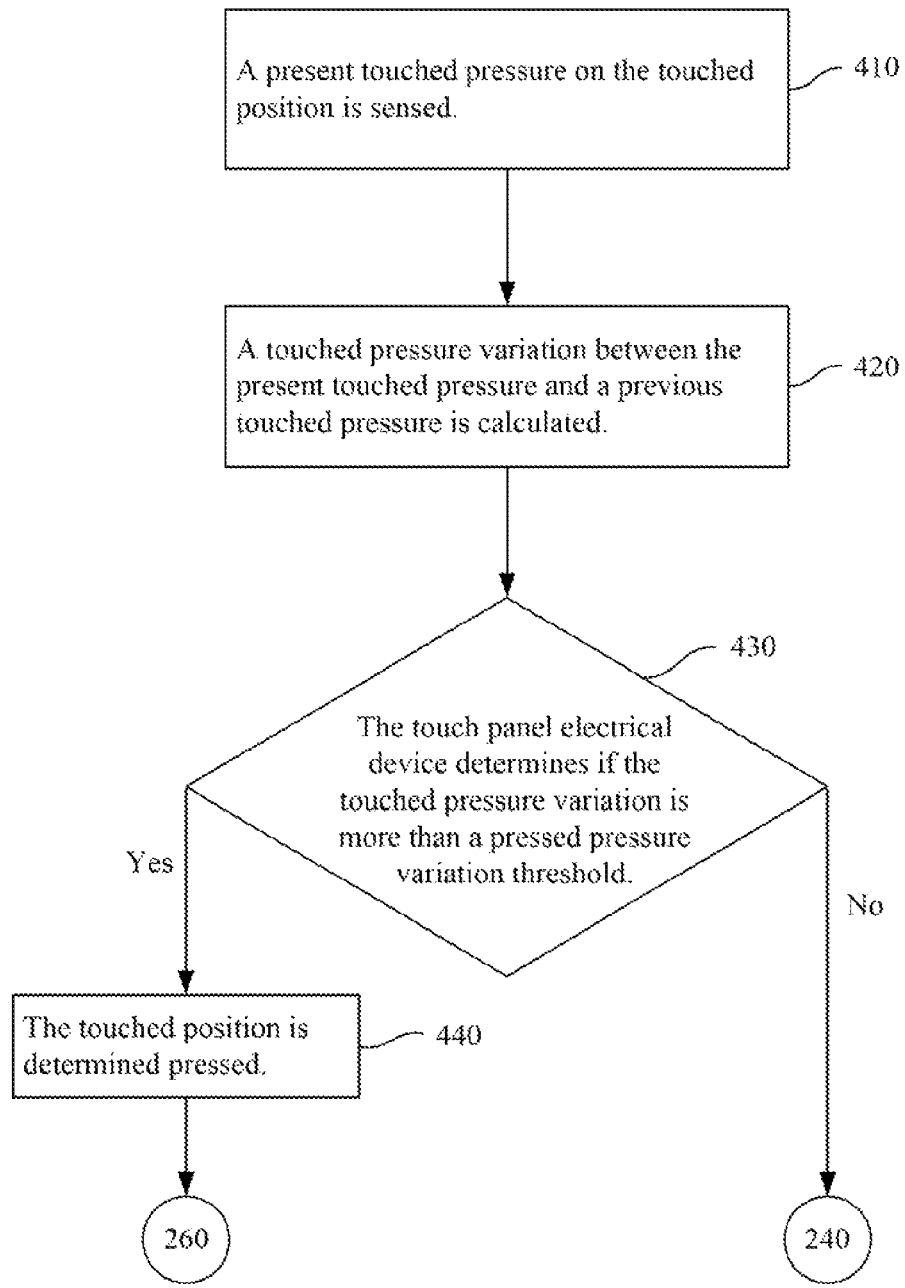
FIG. 4 is another embodiment for the touch panel electrical device to determine if execute the touched instruction or not (step 250) in FIG. 2.

FIG. 4 is another embodiment for the touch panel electrical device to determine if execute the touched instruction or not (step 250) in FIG. 2. Since the touched pressure or the touched pressure variation on the touch panel when users press the touch panel is more than that when users touch the touch panel, the touch panel electrical device may determine if the touched position is pressed according to the touched pressure on its touch panel. Therefore, the step for the touch panel electrical device to determine if execute the touched instruction or not (step 250) may include the following steps:

In step 410, a present touched pressure on the touched position is sensed.

In step 420, a touched pressure variation between the present touched pressure and a previous touched pressure is calculated. Wherein, the touched pressure variation may be difference, ratio or other statistics value between the present touched pressure and the previous touched pressure. In addition, a touched pressure sensed previously may be recorded as the previous touched pressure.

In step 430, the touch panel electrical device determines if the touched pressure variation is more than a pressed pressure variation threshold. If the touched pressure variation is not more than the pressed pressure variation threshold, the touch panel electrical device senses if the present touched position has been continually touched (step 240). In addition, the present touched pressure may be recorded as the previous touched pressure for calculating next touched pressure variation if the touched pressure variation is not more than the pressed pressure variation threshold.

In step 440, if the touched pressure variation is more than the pressed pressure variation threshold, the present touched position is determined pressed. Then, the touch panel electrical device executes the touched instruction corresponding to the present touched position (step 260). In another embodiment, the touch panel electrical device may determine if the present touched position is pressed through determining if the touched pressure is more than a pressed pressure threshold, which should not be limited in this embodiment. Wherein, the present touched position is determined pressed if the touched pressure is more than the pressed pressure threshold. Therefore, the touch panel electrical device may be operated according to touched pressure.

Above all, users may realize the touched instruction corresponding to the touched position according to the notice vibration signal they feel or the notice sound signal they hear. Hence, blind people can operate touch panel electrical devices without seeing graphical button shown by touch panels. In addition, several embodiments are provided to make touch panel electrical devices execute instructions selected through touch panels.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel electrical device, comprising:
   a touch panel, sensing a touched position on the touch panel;
   a notice signal generator; and
   a processing unit, electrically connected with the touch panel and the notice signal generator, comprising:
      a notice-generating module, making the notice signal generator generate a notice sound signal or a notice vibration signal according to the touched position to notice a user of a touched instruction corresponding to the touched position he/she touches;
      an executing module, executing the touched instruction if the touched position has been continually touched and a confirm signal is received;
      a confirm module, generating the confirm signal when the touched position or a confirm button of the touch panel electrical device is pressed, wherein the confirm button is electrically connected with the processing unit; and
      an area-sensing module, sensing a present touched area around the touched position on the touch panel, wherein the confirm module of the processing unit calculates a touched area variation between the present touched area and a previous touched area, and the touched position is determined pressed if the touched area variation is more than a pressed area variation threshold,
   wherein a touched pixel number of the touch panel around the touched position is sensed to calculate the present touched area.

2. The touch panel electrical device of claim 1, wherein the touch panel further comprises:
   a pressure-sensing module, sensing a present touched pressure on the touched position, wherein the confirm module of the processing unit calculates a touched pressure variation between the present touched pressure and a previous touched pressure, and the touched position is determined pressed if the touched pressure variation is more than a pressed pressure variation threshold.

3. The touch panel electrical device of claim 1,
   wherein the confirm module generates the confirm signal when the touched position has been continually touched and another position on the touch panel is touched.

4. The touch panel electrical device of claim 1,
   wherein the confirm module generates the confirm signal if the touched position has been touched more than a time threshold.

5. The touch panel electrical device of claim 1, wherein the notice signal generator is a speaker or a vibrator, the speaker generates the notice sound signal, the vibrator generates the notice vibrate signal.

6. A method for operating a touch panel electrical device, wherein the touch panel electrical device comprises a touch panel, the method for operating the touch panel electrical device comprises:
   sensing a touched position on the touch panel;
   generating a notice sound signal or a notice vibration signal according to the touched position to notice a user a touched instruction corresponding to the touched position he/she touches;
   determining if execute the touched instruction or not, wherein the step of determining if execute the touched instruction or not comprises:
      determining if the touched position is pressed, wherein the touched instruction is determined to be executed if the touched position is determined pressed, wherein the step of determining if the touched position is pressed comprises:
         sensing a present touched area around the touched position on the touch panel;
         calculating a touched area variation between the present touched area and a previous touched area; and
         determining if the touched area variation is more than a pressed area variation threshold, wherein the touched position is determined pressed if the touched area variation is more than the pressed area variation threshold; and
   if the touched instruction is determined to be executed, making the touch panel electrical device execute the touched instruction.

7. The method for operating the touch panel electrical device of claim 6, further comprising:
   continually sensing if the touch panel is touched; and
   sensing and recording the touched position and the previous touched area if the touch panel is touched.

8. The method for operating the touch panel electrical device of claim 6, wherein the step of determining if the touched position is pressed further comprises:
   sensing a present touched area around the touched position on the touch panel; and
   determining if the present touched area is more than a pressed area threshold, wherein the touched position is determined pressed if the present touched area is more than the pressed area threshold.

9. The method for operating the touch panel electrical device of claim 6 or 8, wherein the step of sensing the present touched area around the touched position on the touch panel comprises:
   sensing a touched pixel number of the touch panel around the touched position; and
   calculating the present touched area according to the touched pixel number.

10. The method for operating the touch panel electrical device of claim 6, wherein the step of determining if the touched position is pressed further comprises:
- sensing a present touched pressure on the touched position;
- calculating a touched pressure variation between the present touched pressure and a previous touched pressure; and
- determining if the touched pressure variation is more than a pressed pressure variation threshold, wherein the touched position is determined pressed if the touched pressure variation is more than the pressed pressure variation threshold.

11. The method for operating the touch panel electrical device of claim 10, further comprising:
- taking the present touched pressure as the previous touched pressure if the touched pressure variation is not more than the pressed pressure variation threshold.

12. The method for operating the touch panel electrical device of claim 10, further comprising:
- continually sensing if the touch panel is touched; and
- sensing and recording the touched position and the previous touched pressure if the touch panel is touched.

13. The method for operating the touch panel electrical device of claim 6, wherein the step of determining if the touched position is pressed further comprises:
- sensing a present touched pressure on the touched position; and
- determining if the present touched pressure is more than a pressed pressure threshold, wherein the touched position is determined pressed if the present touched pressure is more than the pressed pressure threshold.

14. The method for operating the touch panel electrical device of claim 6, wherein the step of determining if execute the touched instruction or not further comprises:
- sensing if there is another touched position on the touch panel, wherein the touched instruction is determined to be executed if there is another touched position on the touch panel.

15. The method for operating the touch panel electrical device of claim 6, wherein the step of determining if execute the touched instruction or not further comprises:
- determining if a confirm button of the touch panel electrical device is pressed, wherein the touched instruction is determined to be executed if the confirm button is pressed.

16. The method for operating the touch panel electrical device of claim 6, wherein the step of determining if execute the touched instruction or not further comprises:
- determining if the touched position has been touched more than a time threshold, wherein the touched instruction is determined to be executed if the touched position has been touched more than the time threshold.

17. A method for operating a touch panel electrical device according to touched area, wherein the touch panel electrical device comprises a touch panel, the method for operating the touch panel electrical device according to touched area comprises:
- sensing a touched position on the touch panel;
- determining if execute a touched instruction corresponding to the touched position or not according to a present touched area around the touched position on the touch panel, wherein the step of determining if execute the touched instruction or not comprises:
  - determining it the touched position is pressed, wherein the touched instruction is determined to be executed if the touched position is determined pressed, wherein the step of determining if the touched position is pressed comprises:
    - sensing a present touched area around the touched position on the touch panel;
    - calculating a touched area variation between the present touched area and a previous touched area; and
    - determining if the touched area variation is more than a pressed area variation threshold, wherein the touched position is determined pressed if the touched area variation is more than the pressed area variation threshold; and
- if the touched instruction is determined to be executed, making the touch panel electrical device execute the touched instruction.

18. The method for operating the touch panel electrical device according to touched area of claim 17, further comprising:
- generating a notice sound signal or a notice vibration signal according to the touched position to notice a user of the touched instruction corresponding to the touched position he/she touches.

19. The method for operating the touch panel electrical device according to touched area of claim 17, further comprising:
- sensing if the touch panel has been continually touched, wherein the step of determining if executing the touched instruction or not is continually executed according to the present touched area if the touch panel has been continually touched.

* * * * *